Nov. 4, 1941.                F. ALLENDORFF                2,261,838
            INSTRUMENT FOR MEASURING ROTARY OSCILLATIONS OF ROTATING SHAFTS
                              Filed Jan. 13, 1939
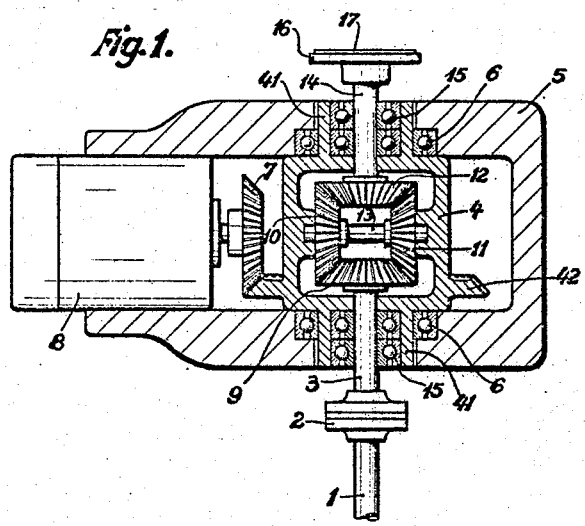
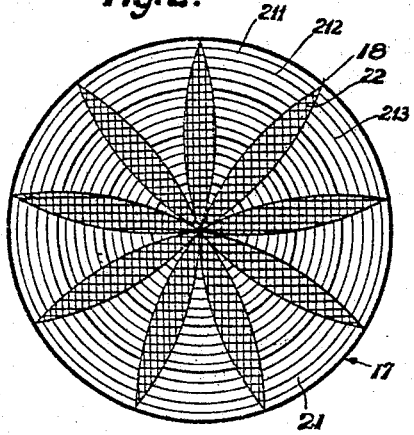
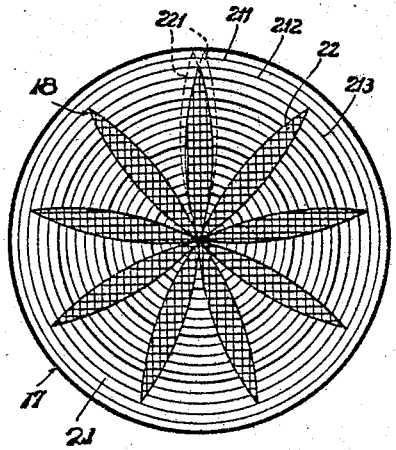
Inventor
Friedrich Allendorff
By Roy F. Steward
his Attorney Patented Nov. 4, 1941

2,261,838

UNITED STATES PATENT OFFICE 2,261,838

INSTRUMENT FOR MEASURING ROTARY OSCILLATIONS OF ROTATING SHAFTS

Friedrich Allendorff, Stuttgart, Germany, assignor to Robert Bosch Gesellschaft mit beschränkter Haftung, Stuttgart, Germany Application January 13, 1939, Serial No. 250,815
In Germany January 14, 1938

1 Claim. (Cl. 73—51)

The present invention relates to an instrument for measuring rotary oscillations of a rotating shaft.

Rotary oscillations, the magnitude of which is not known at all clearly in most cases, occur almost throughout the rotation of shafts, especially the shafts of internal combustion engines, and up to the present time suitable instruments for measuring said rotary oscillations have not been available.

One object of the invention is to provide a simple and compact instrument which will make it possible to separate the oscillations of a rotary member or shaft from the mere constant rotary movement thereof and to indicate these oscillations. A further object of the invention is to provide inexpensive means for ascertaining and indicating the magnitude of the separated oscillations.

According to the present invention to the end of the shaft to be examined, is connected a differential gear, the housing of which is rotated uni-directional to the shaft and at such a speed that no rotation but merely rotational oscillations only of the shaft are transmitted to the free shaft of the differential gear.

The invention is more particularly described with reference to the accompanying drawing which shows one form of construction diagrammatically by way of example and in which:

Figure 1 is a section through the instrument and,

Figures 2 and 3 are enlarged detail plan views of the means, adapted to be connected to the oscillating shaft of the instrument, for indicating, and measuring the amplitude of, the torsional oscillations of the shaft to be examined, these figures showing said means when said shaft is stationary or non-oscillating, and oscillating, respectively.

In the drawing, one end of the shaft to be examined is represented at 1. One shaft 3 of a differential gear is connected to the end of the shaft 1 by means of a coupling 2, said differential gear having a housing 4 which in turn is rotatably mounted in a fixed frame 5. For this purpose, the housing 4 has two hollow end hubs or sockets 41 which revolve in bearings 6 housed in the frame 5.

On the housing 4 there is cast or secured a bevel wheel 42 which co-operates with a bevel wheel 7, driven by an electric motor 8 which is rigid with the frame 5 and the speed of rotation of which can be regulated to a fine extent so as to compensate the rotation of the shaft 1.

In the interior of the differential housing 4 are mounted in the usual way four bevel wheels 9, 10, 11, 12, of which the wheel 9, as the driving wheel, is firmly keyed to the shaft 3, while the wheels 10 and 11 rotate on an intermediate spindle 13 mounted in the gear housing. The end wheel 12 is seated on a shaft 14 which, like the shaft 3, is mounted by means of bearings 15 in the hollow hubs or sockets 41 of the gear housing.

On the free end of shaft 14, which makes no full revolutions but only rotary oscillations when the member or shaft to be examined is oscillating and when the differential housing and the member or shaft to be examined are both rotating in the same direction at the same speed, is fitted means for indicating and making visible, and measuring the amplitude of, rotary oscillations or vibrations of said shaft.

In the example illustrated, such means for indicating and readily measuring the amplitude of such rotary vibrations or oscillations comprises a disk or base 16, secured to the free end of shaft 14, and provided on its outer face with a combined indicator and scale indicated generally by 17. The exact form, construction and mode of attachment of the indicator and scale 17 may differ widely without the scope of my invention, but in the form illustrated it comprises (see Figs. 2 and 3) a diagram formed on or secured to the outer face of the supporting disc 16 and comprising an indicator indicated generally by 18 and a scale indicated generally by 21. The scale comprises a plurality of equally spaced concentric rings 211, 212, 213, etc. and the indicator comprises a plurality of opaque or black, leaf-like, radially extending surfaces or star-rays 22 arranged to form a contrast with their background. These black surfaces or rays are so dimensioned that their width at each intersection with a ring subtends an angle of a predetermined number of degrees which angle constantly increases inwards from ring to ring, i. e. the width of each leaf-like figure, measured in degrees of arc, increases at a constant rate radially inwardly from ring to ring over at least the major or outer part of the disc. At the outermost ring 211 the width of each black radial figure or ray 22 is, for example sufficient to subtend an angle of two degrees at the centre of the disc, whilst at the point of intersection of each figure with the second ring from the outside (212) the width corresponds to an angle of four degrees and at the point of intersection with the third ring from the outside (213), the angle subtended is six degrees and so on.

Now if the disc with the shaft 14 and the disc 16 provided with the diagram 17 is set into rotational oscillations, then the leaf plate-like surfaces or star-rays 22 also oscillate to and fro in association. Should the amplitude of vibration be such that the angle subtended is, for instance, two degrees on each side of the mean or stationary position, i. e. a total of four degrees, then due to the high frequency of the oscillations the image of the rapidly vibrating leaf like figures or star-rays 22 (suggested by dotted lines 221 in Fig. 3) will be so represented to the eye that only the parts thereof overlapping at the two outermost positions of the surfaces will appear as dark or black surfaces. The tip of this overlapping surface is then located on the second ring from the outside (212) as shown in the black shaded parts because, on an oscillation through two degrees on either side of the mean position of each leaf or ray, the actual tip of each leaf figure and all the parts thereof located outside this ring, cannot be seen because they do not overlap during an oscillation of four degrees. With increasing amplitude of vibration the tip of the overlapping part surface of the figure will thus continue to move towards the centre of the rings and it follows that the extent of withdrawal can be read off in degrees of the angle subtended by noting the particular ring and the fraction of the distance, if any, to the next ring of the point at which the tip is formed, and thus directly ascertain the magnitude of the rotary oscillation of the rotating shaft.

If desired, any known means for measuring the frequency and the time of the oscillations of oscillating shaft 14 may be associated therewith.

I declare that what I claim is:

An instrument for measuring rotary oscillations of a rotating shaft comprising a differential gear, including a rotatable housing and a plurality of shafts and wheels rotatably connecting said shafts, one wheel of which gear rotates with said shaft to be examined, variable-speed means to rotate the housing in the same direction as said shaft and at such a speed that the opposite free shaft of the gear does not rotate, and a disc having concentric equally spaced rings and radially extending leaf like opaque surfaces thereon of which the width corresponds at the point of intersection with each ring to a predetermined angle of torsion which increases at a constant rate with each successive inwardly adjacent ring, the said disc being connected to the opposite shaft of the differential gear to that connected with the shaft to be examined.

FRIEDRICH ALLENDORFF.